UNITED STATES PATENT OFFICE.

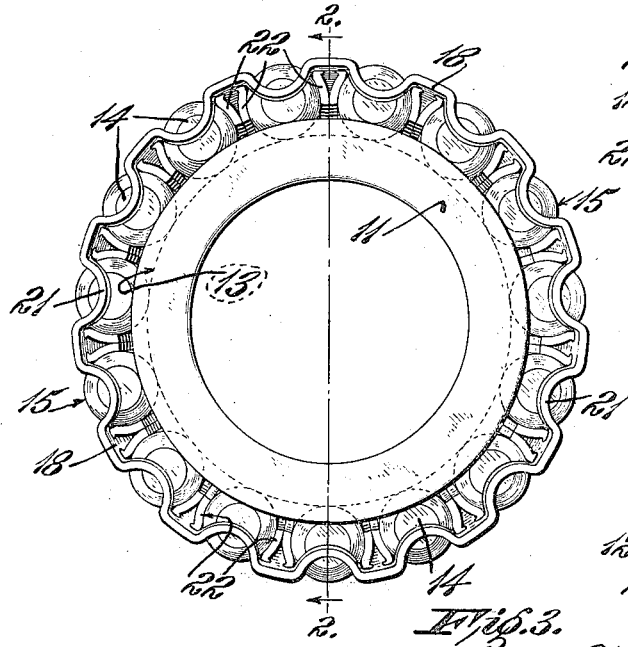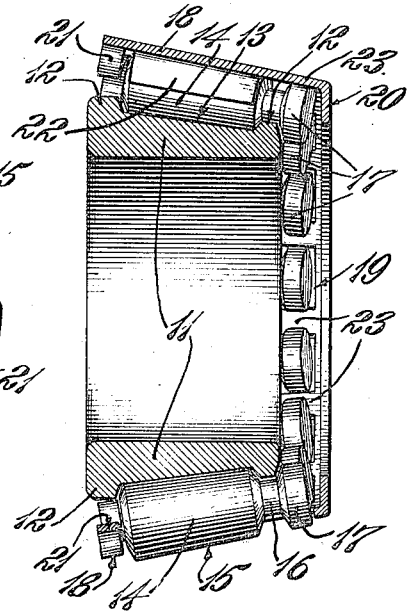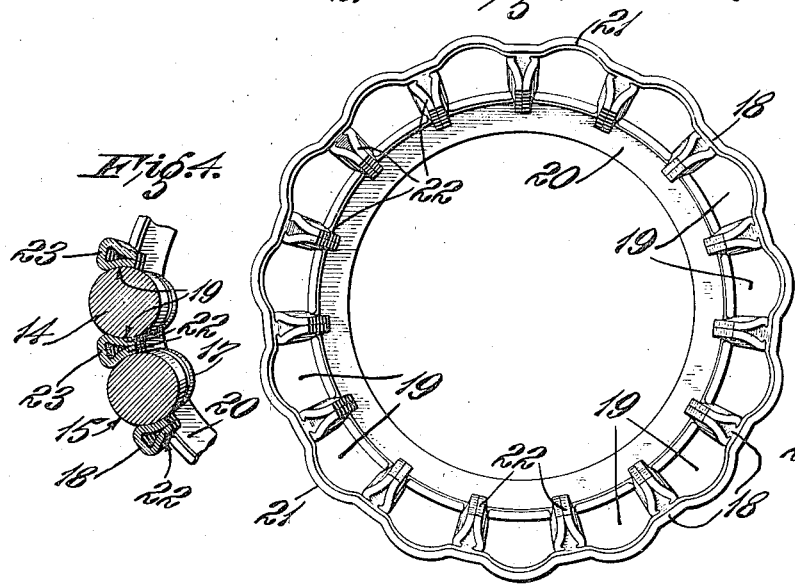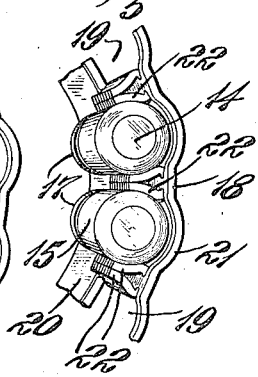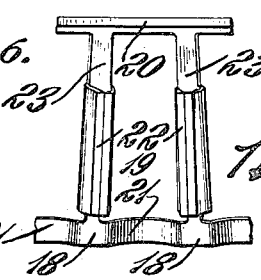

HERBERT VANDERBEEK, OF CANTON, OHIO, ASSIGNOR TO THE TIMKEN ROLLER BEARING COMPANY, OF CANTON, OHIO, A CORPORATION OF OHIO.

ROLLER-BEARING.

1,144,451.  Specification of Letters Patent.  Patented June 29, 1915.

Application filed June 16, 1913. Serial No. 773,871.

*To all whom it may concern:*

Be it known that I, HERBERT VANDERBEEK, a citizen of the United States, and a resident of the city of Canton, in the county of Stark and State of Ohio, have invented a new and useful Improvement in Roller-Bearings, of which the following is a specification.

This invention relates to antifriction bearings of the type wherein a series of rollers having parallel or converging axes is spaced between two concentric cylindrical or conical bearing surfaces, and has for an object increasing the number of rollers in such bearings, and thereby the load carrying capacity thereof, without increasing the outside dimensions of the bearings or reducing the strength of their parts.

A further object of the invention is to provide a rigid roller spacing means insuring more perfect alinement of the rollers than has been maintained heretofore in commercial bearings of this type.

A further object of the invention is to provide a spacing means for the rollers which permits of removing and replacing the rollers without distorting the rollers, bearing ring, or roller guiding portions of the spacing cage.

This invention relates particularly to the means for holding the rollers in proper spaced relation, and consists in an improved pressed sheet metal roller cage adapted to be assembled with the bearing ring and rollers in the manner hereinafter set forth.

The invention further consists in a bearing ring, rollers and cage, assembled substantially as shown in the accompanying drawings, and in the several parts thereof, as more fully appears hereinafter in connection with the description of the devices shown in the drawings. The invention is more particularly set forth in the appended claims.

The invention is herein illustrated as applied to a bearing having conical rollers, like that shown in Alden Patent No. 921656, dated May 18, 1909.

In the drawings, in which like reference characters are used to designate the same parts in the several views,—Figure 1 is an end view of an assembled bearing ring, rollers, and roller spacing cage made in accordance with this invention; Fig. 2 is a sectional view of the same on the line 2—2 in Fig. 1; Fig. 3 is an end view of a roller spacing cage prior to being assembled with the rollers and bearing ring; Fig. 4 is a transverse sectional view of a portion of the cage, showing the rollers in assembled position therein; Fig. 5 is an end view of a portion of the cage showing the rollers assembled therein prior to crimping in the outer end ring of the cage; and Fig. 6 is an inside plan view of a part of the cage showing a roller pocket.

Referring to Figs. 1 and 2, the antifriction bearing device therein shown is intended to be used in connection with an outer conical bearing ring or "cup" having the same angle between its axis and its bearing surface as the angle between the outer elements of the bearing rollers and the principal axis of the antifriction bearing. This outer bearing ring is not shown in the drawings accompanying this specification, as it forms no part of the present invention.

The inner bearing ring 11, is provided with a circumferential rib 12 at each end. Between the ribs 12 is an annular track 13 around which the antifriction rollers 14 are spaced uniformly with their axes extending lengthwise of the bearing. The rollers 14 are grooved near one end, the bearing portions 15 thus formed between the opposite ends and the grooves being of approximately the same length as the width of the track 13, so that they fit loosely between the ribs 12, as shown in Fig. 2. The reduced neck portions 16 at the grooved ends of the rollers extend over the rib 12 at one end of the bearing ring, and the adjacent ends of the rollers are provided with circumferential flanges 17, the inner shoulders of which loosely engage with the outer face of the adjacent rib 12.

The rollers are rigidly held in spaced relation around the inner bearing ring by means of a spacing member or cage 18, provided with pockets 19 for the rollers.

The roller cage is made of a single piece of sheet steel, stamped or pressed into cup shape, with the greater part of the middle of the bottom removed to form an annular ring or flange 20 around its inner edge. The circumferential portion of the cup shaped steel stamping is slit lengthwise at uniform distances around its circumference nearly from its outer edge to the flange 20. The number of slits corresponds with the number of roller pockets 19. Circumferential slits or slots are made across the ends of the lengthwise slits, these circumferential slits nearly meeting half way between the lengthwise slits. The ring segments 21 thus formed around the outer edge are crimped or bent outward in a curve to form segments of small circles of larger diameter than the diameter of the adjacent ends of the roller pockets.

The strips of metal inclosed between the circumferential slits on each side of a lengthwise slit are bent inwardly along their unsevered edges, and the wings 22 thus formed are concaved on their adjacent opposing faces to form the roller pockets 19. The width of the unsevered strips 23 left connecting the outer ring 21 and flange 20 is such that the wings forming adjacent pockets touch back to back at their extremities. The thickness of the sheet metal is such that the wings thus touching each other are substantially rigid, and the width of the wings is such that the roller pockets formed thereby embrace the rollers on both sides at a plurality of diametrically opposite points. Consequently, the pockets are too deep for the rollers to be forced into or out of them sidewise, except as hereinafter described. The length of the wings, and hence the length of the roller pockets, is approximately equal to the length of the bearing portions 15 of the rollers, and the curvature of the wings is the same as that of the rollers, whereby the latter fit closely, but not tightly, in the pockets.

To assemble the parts, the rollers are first properly arranged in spaced relation around the bearing ring 11 in the track 13, and the cage is then slipped endwise over them, each roller entering one of the pockets 19, whereupon the outward crimped segmental portions 21 of the outer end ring of the cage are bent inward to cross the ends of the rollers and lock the cage and rollers in assembled position. The flanges 12 on the inner bearing member prevent the latter from becoming withdrawn from the rollers and cage, and accordingly the assembled inner ring, rollers and cage constitute a unitary group of antifriction bearing parts which may be conveniently handled together as one piece.

In order to remove and replace one or more rollers without removing the cage, and thereby dismounting all the rollers, the inward crimped portion 21 of the outer end ring of the cage next a roller to be removed is bent outward into a form in which it is approximately straight, thereby spreading apart the adjacent ends of the wings 22 of the roller pocket. The end of the roller next the crimped portion 21 may be slipped out of the roller pocket transversely, and when it has cleared the crimped portion it may be withdrawn from the cage lengthwise. Another roller may be inserted in an empty pocket by reversing the operation. After a roller has been inserted by the above described operation the crimped portion of the outer ring of the cage should be bent in sufficiently to draw the wings of the pocket close, but not too tight, against the roller. Neither the rollers nor the side walls of the roller pockets are distorted by the operation of replacing a roller.

From the above description, it is evident that a roller spacing cage constructed in accordance with this invention constitutes a rigid and secure means for maintaining the rollers in proper spaced relation around the bearing ring, and that such a cage may be assembled with the rollers and bearing ring without distorting any of the bearing members or injuriously affecting the subsequent alinement of the rollers.

The invention is not restricted to the particular forms and arrangements of parts shown in the drawings.

What I claim as my invention is as follows:

1. An integral sheet metal roller bearing cage comprising spaced longitudinal members and end rings, said longitudinal members being provided with inwardly extending wings having concave surfaces forming roller pockets which embrace the rollers at four diametrically opposite points and the extremities of the wings between the pockets being in contact, said rings having inwardly extending portions adapted to prevent longitudinal displacement of the rollers, the inwardly extending portions of one of said rings having concave segments capable of being bent to uncover the end of the pocket.

2. A sheet metal roller bearing cage comprising lengthwise peripheral portions and end rings integral therewith, said peripheral portions being spaced apart and provided along their margins with inwardly extending wings having concave surfaces adapted to form roller pockets between adjacent peripheral portions, the extremities of the wings between the roller pockets being in contact, and one of said end rings being crimped inward to retain rollers in said pockets, said crimped portions being adapted to be bent outward beyond the ends of said roller pockets, whereby rollers may be inserted therein or removed therefrom.

3. A pressed steel roller bearing cage comprising lengthwise spacing strips having rigid flanges along their edges and end rings integral therewith, said spacing strips being spaced apart and the flanges having concave surfaces forming roller pockets between them adapted to embrace rollers at four diametrically opposite points, whereby said rollers are rigidly held against sidewise displacement both circumferentially and radially said end rings being arranged to prevent longitudinal displacement of the rollers, one of said end rings having concave segments capable of being bent to uncover the ends of said pockets.

4. A pressed steel roller bearing cage comprising continuous end rings and connecting members integral therewith, said connecting members being spaced circumferentially between said end rings and having rigid wings projecting inwardly therefrom forming roller pockets, rollers in said pockets, the spaces between the tips of the wings forming said roller pockets being narrower than the corresponding diameters of the rollers, whereby the rollers can not be sprung into or out of the pockets, one of said end rings having portions which extend inward across the ends of said roller pockets to retain said rollers therein and which are adapted to be bent outwardly whereby said rollers may be removed therefrom.

5. A pressed steel roller bearing cage comprising lengthwise flanged spacing strips and end rings integral therewith, said flanged spacing strips being spaced apart circumferentially to form roller pockets, and one of said end rings being adapted to be bent outward between any two adjacent spacing strips to permit rollers to be inserted lengthwise in said pockets.

6. A roller bearing comprising in combination an inner bearing member having ribs at both ends thereof, a series of rollers spaced around said bearing member between said ribs, and a pressed steel cage for said rollers consisting of a body portion having rigid flanges forming pockets embracing each of the opposite sides of said rollers at points on both sides of a diameter connecting said sides, and end portions closing the ends of said pockets whereby said rollers are held against both axial and radial movement with respect to said inner bearing member, the end portions at one end of said cage being flexible whereby they may be bent outwardly to permit said rollers to be removed.

7. A roller bearing comprising an inner bearing member having ribs at both ends thereof, a series of rollers spaced around said bearing member between said ribs, and a pressed steel cage comprising a body portion having rigid side walls forming pockets embracing said rollers diametrically on two diameters and end portions integral therewith closing the ends of said pockets, whereby said rollers are normally held against both axial and radial movement, said end portions at one end of the cage being normally concave but being bendable in and out across the ends of said pockets.

8. A roller bearing comprising an inner bearing member having a circumferential rib, a series of grooved rollers spaced around said bearing member embracing said rib, and a pressed steel cage for said rollers comprising a body portion having rigid pockets for said rollers, and end portions integral therewith closing the ends of said pockets, one of said end portions comprising segments longer than the diameter of said pockets, said segments being crimped in to embrace said rollers and retain them in assembled position.

9. A roller bearing cage comprising a body portion having pockets for rollers adapted to embrace the latter around diametrically opposite faces, said pockets being closed at one end of said cage, and concave end segments at the opposite end of said cage integral therewith closing the adjacent ends of said pockets, said end segments being flexible whereby they may be bent to open the ends of the roller pockets adjacent thereto that rollers may be inserted therein and removed therefrom.

10. A roller bearing cage comprising a body portion having pockets for rollers, and end segments integral therewith closing the ends of said pockets, the end segments at one end of said cage being longer than the width of the pockets whereby they may be bent to open the ends of the roller pockets adjacent thereto.

Signed at Canton, O., this 11th day of June, 1913.

HERBERT VANDERBEEK.

Witnesses:
  AUSTIN LYNCH,
  GERTRUDE KELLOGG.